United States Patent [19]

Ritsko et al.

[11] Patent Number: 4,801,472

[45] Date of Patent: Jan. 31, 1989

[54] PROCESS FOR COATING TUNGSTEN CARBIDE WITH COBALT METAL

[75] Inventors: Joseph E. Ritsko, Towanda; Jen S. Lee, Sayre, both of Pa.

[73] Assignee: GTE Product Corporation, Stamford, Conn.

[21] Appl. No.: 88,321

[22] Filed: Aug. 24, 1987

[51] Int. Cl.$^4$ ............................................... B05D 7/00
[52] U.S. Cl. ..................... 427/217; 427/350; 427/352; 427/377
[58] Field of Search ................ 427/217, 377, 350, 352

[56] References Cited

U.S. PATENT DOCUMENTS

| | | | |
|---|---|---|---|
| 2,119,487 | 5/1938 | Padowicz | 427/217 |
| 4,242,376 | 12/1980 | Kawasumi et al. | 427/217 |
| 4,309,457 | 1/1982 | Kawasumi et al. | 427/217 |

FOREIGN PATENT DOCUMENTS

| | | | |
|---|---|---|---|
| 213602 | 8/1957 | Australia | 427/217 |
| 561829 | 8/1958 | Canada | 427/217 |

*Primary Examiner*—Janyce Bell
*Attorney, Agent, or Firm*—Donald R. Castle; L. Rita Quatrini

[57] ABSTRACT

A process is disclosed for coating tungsten carbide with cobalt metal. The process involves forming an aqueous slurry of tungsten carbide having a particle size of no greater than about −100 mesh, and zinc powder, adding ammonia to the slurry in an amount sufficient so that the slurry is basic after the addition of cobalt chloride, adding a solution of cobalt chloride to the ammoniated slurry with the amount of cobalt chloride being sufficient to provide a coating of partially reduced cobalt on the tungsten carbide, removing this cobalt coated tungsten carbide from the resulting liquor, and heating the coated tungsten carbide in a reducing atmosphere to effect the essentially complete reduction of the cobalt and to produce a cobalt metal coating on the tungsten carbide.

3 Claims, No Drawings

PROCESS FOR COATING TUNGSTEN CARBIDE WITH COBALT METAL

This invention relates to a process for forming a cobalt metal coating on tugsten carbide.

BACKGROUND OF THE INVENTION

Most tungsten carbide-cobalt plasma spray powders are produced by mixing fine tungsten carbide with cobalt. These powders are sintered to produce the tungsten carbide-cobalt particles. These materials do not lend themselves to bonding in a low temperature flame spray application.

Good bond strength in cobalt-cobalt contact is desirable in many applications such as hardsurfacing. This would be accomplished by coating tungsten carbide with cobalt. In the application, this would allow the cobalt to melt at lower temperatures than plasma tempertures. Also, these coated powders lend themselves to better bond strength even if used in plasma applications.

An additional advantage of coating is that coarse tungsten carbide can be used. In certain types of wear applications it is desirable to use coarse tungsten carbide particles.

SUMMARY OF THE INVENTION

In accordance with one aspect of this invention there is provided a process for coating tungsten carbide with cobalt metal. The process involves forming an aqueous slurry of tungsten carbide having a particle size of no greater than about $-100$ mesh, and zinc powder, adding ammonia to the slurry in an amount sufficient so that the slurry is basic after the addition of cobalt chloride, adding a solution of cobalt chloride to the ammoniated slurry with the amount of cobalt chloride being sufficient to provide a coating of partially reduced cobalt on the tungsten carbide, removing this cobalt coated tungsten carbide from the resulting liquor, and heating the coated tungsten carbide in a reducing atmosphere to effect the essentially complete reduction of the cobalt and to produce a cobalt metal coating on the tungsten carbide.

DETAILED DESCRIPTION OF THE INVENTION

For a better understanding of the present invention, together with other and further objects, advantages and capabilities thereof, reference is made to the following disclosure and appended claims in connection with the above descriptions of some of the aspects of the invention.

By the process of the present invention tugsten carbide is coated with cobalt metal. The tungsten carbide can be tungsten carbide as is, or cast tungsten carbide. In general, the process involves reducing cobalt which is in the form of cobalt chloride, by zinc in ammoniacal solution in the presence of the tungsten carbide to be coated. The cobalt is partially reduced by the zinc and the partially reduced cobalt forms a coating on the tungsten carbide. This coated tungsten carbide is then subjected to reduction in a reducing atmosphere to form cobalt metal and thus a cobalt metal coating is formed on the tungsten carbide.

The details of this process are as described below.

An aqueous slurry is formed of tungsten carbide and zinc metal powder. The tungsten carbide has a particle size typically no greater than about $-100$ mesh and most typically no greater than about $-325$ mesh.

The amount of zinc depends on the amount of cobalt which is to be subsequently added. Since the purpose of the zinc is to reduce the cobalt, the amount of zinc is sufficient to partially reduce the cobalt. Generally, about 2 weight parts or more of zinc are added per weight part of cobalt. This amount provides an excess of zinc, which is desirable. The zinc should be fine enough so that it subsequently dissolves easily in the ammonia.

Generally the slurry is made up of about 1 weight part of the powders to about 15 weight parts of water.

Ammonia, preferably in the form of an ammonium hydroxide solution is added to the aqueous slurry. The amount of ammonium hydroxide is sufficient so that the resulting ammoniated slurry is basic after the addition of cobalt chloride. Although the process is not limited to the amount of ammonia that is added, usually the resulting ammoniated slurry contains from about 5% to about 16% by volume ammonia. It is preferred that the slurry be agitated while the ammonia is being added.

An aqueous cobalt chloride, solution, preferably $CoCl_2.6H_2O$ is made up. The amount of cobalt chloride depends on the amount desired on the coated tungsten carbide. Generally, the cobalt metal coating makes up no greater than about 15% by weight of the tungsten carbide and the amount of cobalt can be determined by anyone of ordinary skill in the art.

The cobalt chloride solution is then added to the ammoniated metal powder slurry. It is critical that the cobalt chloride solution be added slowly. If it is added to fast, the reaction proceeds too fast and the cobalt will not coat the tungsten carbide. Therefore, the cobalt must be added so that the reaction rate is controlled. As a guideline for adding the cobalt solution, a solution of about 1400 g of $CoCl_2.6H_2O$ in about 2.5 gallons of water is added over a period of from about ½ to about 1 hour. Again it is desirable that the slurry be agitated to allow for the most effective mixing.

As a result of the addition of the cobalt solution to the ammoniated slurry of tungsten carbide containing zinc, the cobalt is at least partially reduced, that is cobalt metal can form, or other reduced cobalt species can form. The partially reduced cobalt coats the tungsten carbide.

The resulting cobalt coated tungsten carbide is then removed from the resulting liquor. This is done preferably by use of a magnet which removes all the magnetic solids.

It is preferred that these solids be water washed to remove any excessively fine material such as zinc hydroxide which may be present. This is done preferably by slurrying techniques.

The cobalt in the solids is not all metal at this point. The cobalt must be subjected to a reduction step to insure that essentially all of it is reduced to the metal. This is done by heating the solids in a reducing atmosphere, hydrogen, according to known methods such as at a temperature of about 600° C. for a sufficient time to reduce the cobalt species to cobalt metal. As a result of this step, the cobalt coating on the tungsten carbide becomes a cobalt metal coating.

Typically the zinc levels on the coated tungsten carbide are low, usually about 0.5% to about 2.0% by weight. However, in certain applications, very low zinc levels such as below about 50 weight parts per million are required. Zinc is reduced to these levels by vacuum distillation at about 900° C. Usually this technique reduces the zinc to less than about 30 weight ppm.

To more fully illustrate this invention, the following non-limiting example is presented.

EXAMPLE

To about 7 gallons of water are added about 1500 grams of cast tungsten carbide having a size of about -325 mesh and about 800 grams of zinc metal powder. Separately 2 x 350 grams of $CoCl_2.6H_2O$ are dissolved in 3500 ml of deionized water each. The water slurry of cast tungsten carbide and zinc dust is vigorously agitated and about 1 gallon of about 30% by weight ammonium hydroxide is added. The cobalt chloride solution is then added to a separator funnel and slowly added to the water slurry of zinc and WC over a period of abotu ½ hour. Stirring is continued for an additional half hour. The coated cast tungsten carbide is then removed with a magnet. These solids are water washed by slurrying followed by decantation. By this method, the fines such as zinc hydroxide are also removed. The fines can be subsequently recovered for reuse. The cobalt coating is not all metal and must be further reduced. This is done by reducing the solids in hydrogen. The resulting cobalt metal coated tungsten carbide is then vacuum distilled at about 900° C. to reduce the zinc to less than about 30 weight ppm. While there has been shown and described what are at present considered the preferred embodiments of the invention, it will be obvious to those skilled in the art that various changes and modifications may be made therein without departing from the scope of the invention as defined by the appended claims.

What is claimed is:

1. A process for coating tungsten carbide with cobalt metal, said process comprising:
    (a) forming an aqueous slurry of tungsten carbide having a particle size of no greater than −100 mesh, and zinc metal powder;
    (b) adding ammonia to said slurry with the amount of said ammonia being sufficient so that the slurry is basic after the subsequent addition of cobalt chloride in step c;
    (c) adding to the resulting ammoniated slurry, a solution of cobalt chloride with agitation, to form a coating of partially reduced cobalt on said tungsten carbide;
    (d) removing the resulting cobalt coated tungsten carbide from the resulting liquor; and
    (e) heating said cobalt coated tungsten carbide in a reducing atmosphere to effect the essentially complete reduction of said cobalt and to produce a cobalt metal coating on the tungsten carbide, said coating making up no greater than about 15% by weight of said tungsten carbide.

2. A process of claim 1 comprising the additional step of water washing the cobalt coated tungsten carbide prior to the reduction in the reducing atmosphere.

3. A process of claim 1 comprising the additional step of vacuum distilling said cobalt metal coated tungsten carbide to remove essentaily all of the zinc therefrom.

* * * * *